April 24, 1962 W. H. HOFFMANN 3,031,541

SWITCH

Filed Aug. 5, 1959

*INVENTOR,*

WILLIAM H. HOFFMANN

*BY* Harry M. Saragovitz

ATTORNEY.

United States Patent Office 3,031,541

Patented Apr. 24, 1962

3,031,541

SWITCH

William H. Hoffmann, Rumson, N.J., assignor to the United States of America as represented by the Secretary of the Army

Filed Aug. 5, 1959, Ser. No. 831,917

1 Claim. (Cl. 200—11)

(Granted under Title 35, U.S. Code (1952), sec. 266)

The invention described herein may be manufactured and used by or for the Government for governmental purposes, without the payment of any royalty thereon.

The present invention relates to a switch. Specifically, the invention is concerned with a switch particularly intended for use in printed circuit application.

With the advent and adaptation of printed circuitry in many forms of electronic equipments the need has arisen for an inexpensive, easily manufactured versatile switching means to be used in conjunction with such printed circuitry.

At the present time switches used in applications where printed circuitry is utilized are merely conventional switches that are slightly modified to adapt them for specific applications. It has been found that such switches are limited in use to very particular applications and versatility of such switches is limited.

The primary object of the present invention is to provide a switch adapted for use with printed circuitry that is extremely versatile in its number of applications.

Other features and advantages of the switch will be apparent from a description of the invention that follows.

The invention can best be understood from the following description to be read in view of the accompanying drawing in which.

Figure 1:
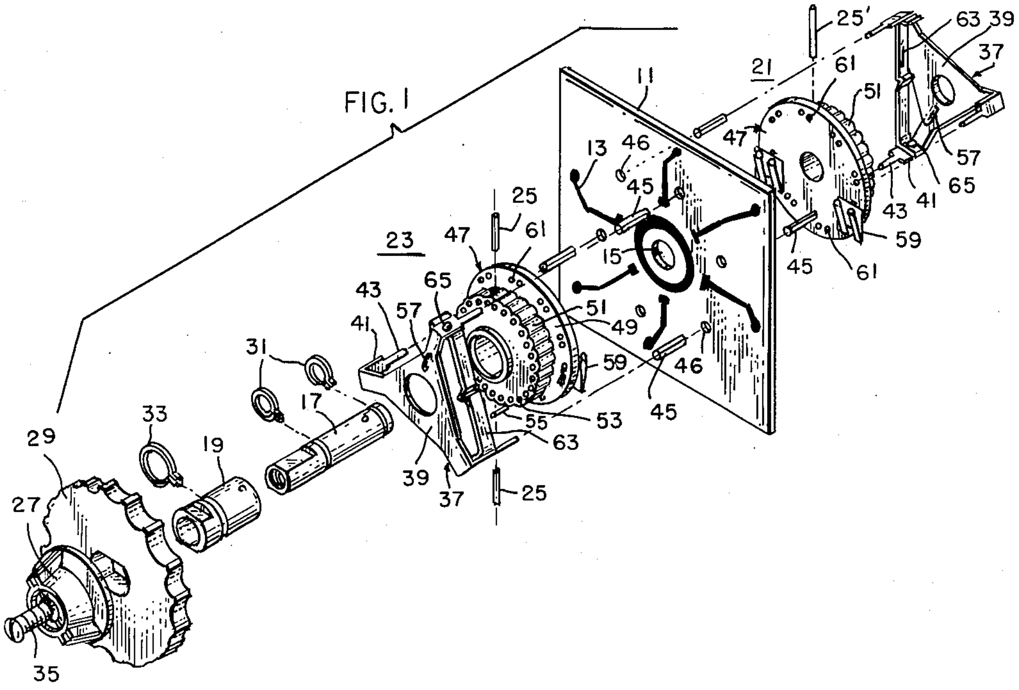
FIG. 1 is an exploded view of one embodiment of the invention.

Referring to the drawing, and particularly the exploded embodiment of FIG. 1, there are shown the component parts of the switch including the stator which, in this application, is in the form of a printed circuit card 11. In this embodiment each surface of the card is provided with printed circuitry switch segments shown at 13. No specific or fixed number of such printed circuitry segments has been shown on the stator 11, it being understood that the configuration and number of segments and any desired number of positions available on the stator will be dependent upon the varied requirements of specific switching arrangements.

The printed circuit stator 11 serves as a supporting medium for the remaining components of the switch, and for such purpose is provided with a central opening 15. Extending through the opening and rotatable therein are a pair of concentric shafts 17 and 19. The shafts 17 and 19 serve to support and rotate, in part, discrete rotor assemblies generally designated as 21 and 23, which for use of description will hereinafter be designated as rear and front rotor assemblies, and wherein rotor assembly 21 is supported by and rotatable with shaft 17 and rotor assembly 23 is supported by and rotatable with shaft 19. The rotors 21, 23, are held fast to their respective shafts by any conventional means such as the pins 25' and 25, respectively. As can be seen from an inspection of the drawings the shaft 17, supporting the rotor 21, is concentric with and rotatable within the shaft 19. To effect rotation of the rear rotor 21 a knob 27 is provided on the shaft 17 and in similar fashion a knob 29 is provided on shaft 19 to effect rotation of the front rotor 23. For securing and confining the respective knobs 27 and 29, means such as lock rings 31 and 33 and screw 35 are provided.

To secure the rotor assemblies, there are provided identical frames 37. For convenience only one of such frames will be described in detail, and as can be seen is of general triangular configuration including a flat base 39 having a central opening through which the shafts 17 and 19 extend. The frame 37 has three mounting legs 41 perpendicular to the base portion 39 which are of relatively thin gauge material and terminate in reduced portion pins 43 which extend through openings in the printed circuit stator card 11. A shoulder is provided on each leg 41 for control of the depth of insertion of the legs into the card 11. For securing the frames 37 to the printed circuit stator there are provided three split lock pins 45 in the form of metallic tubing approximately 5/32 inch long that are split for about 1/16 inch along its length with the split halves crimped together. When the reduced portions 43 of the legs 41 are extended through the card 11 the lock pins 45 are pushed on to the legs to prevent their backing out of the holes. The spring action of the split pins 45, provides a force fit on the reduced portions 43 of the legs 41 to hold the frame 37 securely in place.

The rear and front rotor assemblies 21 and 23 are identical except for the difference in diameter of the center openings to accommodate the respective shafts 17 and 19, and for brevity only one will be described in detail. The assembly 23 includes a multiposition detent cam 47 having a flanged extension 49. The cam 47 includes a plurality of peripheral lobes 51 wherein the number of lobes and corresponding hollows between the lobes is dependent upon the number of switching arrangements desired. Each of the lobes 51 is provided with a centrally disposed hole 53 into which can be inserted pins such as shown at 55. The pins 55 projecting outwardly from the holes act in concert with an inwardly depressed stop 57 formed in the base 39 of the frame 37 to provide stops at the start and finish of rotation of the rotor assembly.

Secured to the underside of the flange 49, that is, the surface adjacent to the printed circuit card, are a series of contacts 59 which serve as a shorting bar from the common pole to the segments of the various contacts. As can be seen, each of the contacts 59 is a flat split metallic bifurcated spring, bent in the middle to provide two independent spring contacts against the printed circuitry with pressure applied through cantilever spring action. To secure the contacts, the contacts are provided with perpendicularly disposed tabs which press fit into openings 61 of the flanged portion 49.

Completing the rotor assembly is a detent spring 63 which serves as a cam follower and serves for indexing of the contacts as the switch is rotated from position to position. The detent 63 is made of a spring metal and is substantially U shaped wherein one leg is provided with an opening through which a rivet 65 can be extended and into an opening in one of the legs 41 of the frame 37, thereby securing one end of said detent to the frame. The other arm of the detent 63 is confined and positioned beneath an adjacent leg of the frame. The central portion of the detent 63 is provided with an inwardly disposed substantially V shaped pawl which, by the spring action of the detent material, is normally urged into engagement between the cam lobes 51 to accurately position the rotor.

Figure 2:
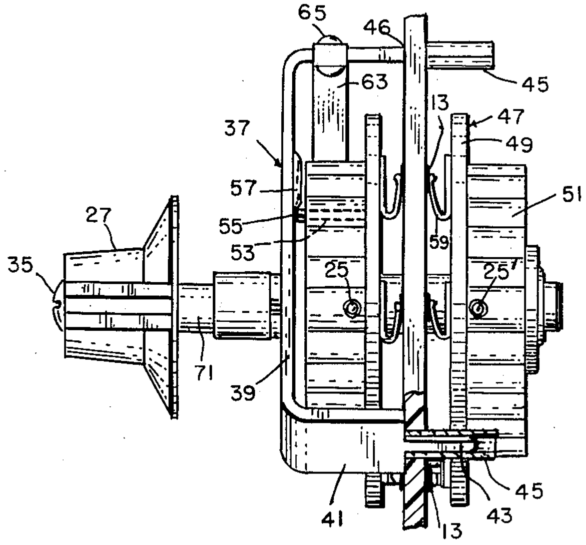
FIG. 2 is an elevational view partly in cross-section of another embodiment of the invention.

The modification shown as an assembly in FIG. 2 is substantially identical to the switch shown in FIG. 1 and accordingly parts and components common to both switches have been given like numbers. The one basic difference between the switches is that the switch of FIG. 2 utilizes one shaft shown at 71 in lieu of the two shafts of the switch shown in FIG. 1. By the use of the single shaft both rotors operate on said single shaft and operate simultaneously.

While there has been described what is at present considered a presferred embodiment of the invention, it will be obvious to those skilled in the art that various changes and modifications may be made therein without departing from the invention, and it is therefore aimed in the appended claim to cover all such changes and modifications as fall within the true spirit and scope of the invention.

What is claimed is:

A switch including in combination a stator comprising a fixed printed circuit card having a plurality of openings therein, at least one adjustably rotatable rotor spaced from said stator, said rotor comprising a substantially circular body having a lobed peripheral edge surface and a radially extending flanged portion having thereon a plurality of contacts that engage said printed circuit card, a frame of general triangular configuration including a base and discrete mounting legs perpendicular to the base and that extend from the discrete apices of the base and adapted to be inserted and locked in the openings of said card to confine and urge said rotor toward said printed circuit card, said rotor having a plurality of openings in said lobed segments and a plurality of pins in said openings that engage a portion of said frame for limiting the rotational movement of said rotor, means in engagement with the lobed portion of the rotor for indexing said rotor comprising a substantially U shaped spring, one leg of which is secured to said frame and having a V shaped indent in its base portion that is normally urged into engagement into the depressed portions between adjacent lobes on the peripheral edge of the rotor, and a shaft extending through openings in said, frame, rotor, and printed circuit card for effecting rotation of said rotor.

References Cited in the file of this patent

UNITED STATES PATENTS

| | | |
|---|---|---|
| 1,020,155 | Phillips | Mar. 12, 1912 |
| 1,999,019 | Hall et al. | Apr. 23, 1935 |
| 2,026,773 | Dressel et al. | Jan. 7, 1936 |
| 2,489,626 | Doucette | Nov. 29, 1942 |
| 2,796,474 | Glogau | June 18, 1957 |
| 2,845,501 | George | July 29, 1958 |
| 2,848,584 | Goudy | Aug. 19, 1958 |
| 2,896,033 | Hartz | July 21, 1959 |
| 2,906,838 | Deighton | Sept. 29, 1959 |
| 2,934,615 | Goral | Apr. 26, 1960 |
| 2,971,066 | Tabet | Feb. 7, 1961 |